Jan. 27, 1925.                                                  1,524,064
                          M. TIERNAN
                           TRACTOR
                     Filed May 11, 1920           2 Sheets-Sheet 2
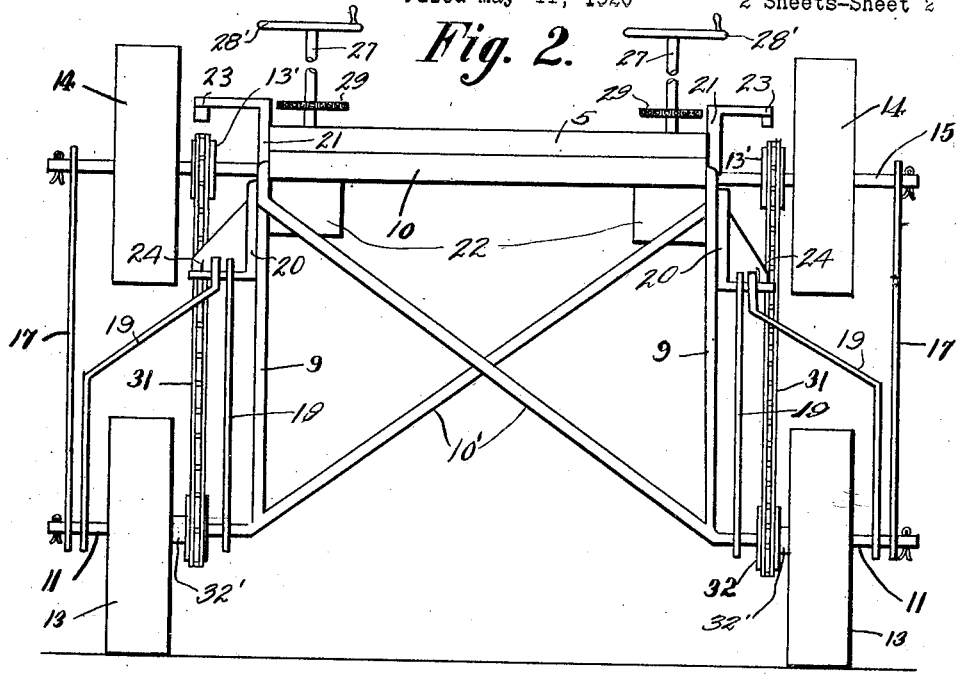
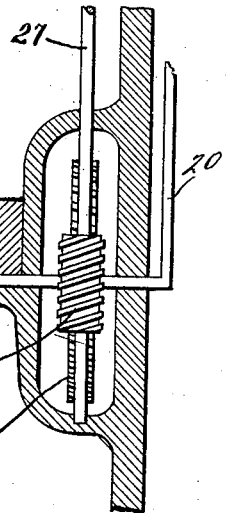
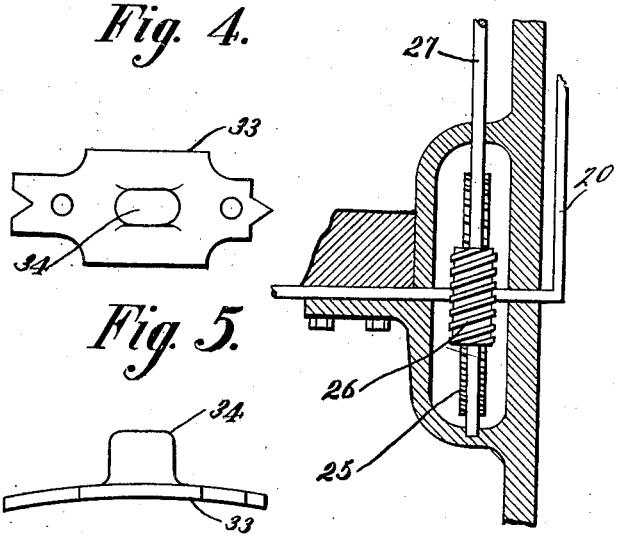
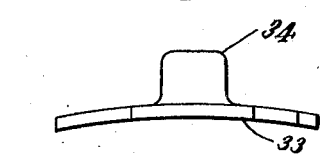

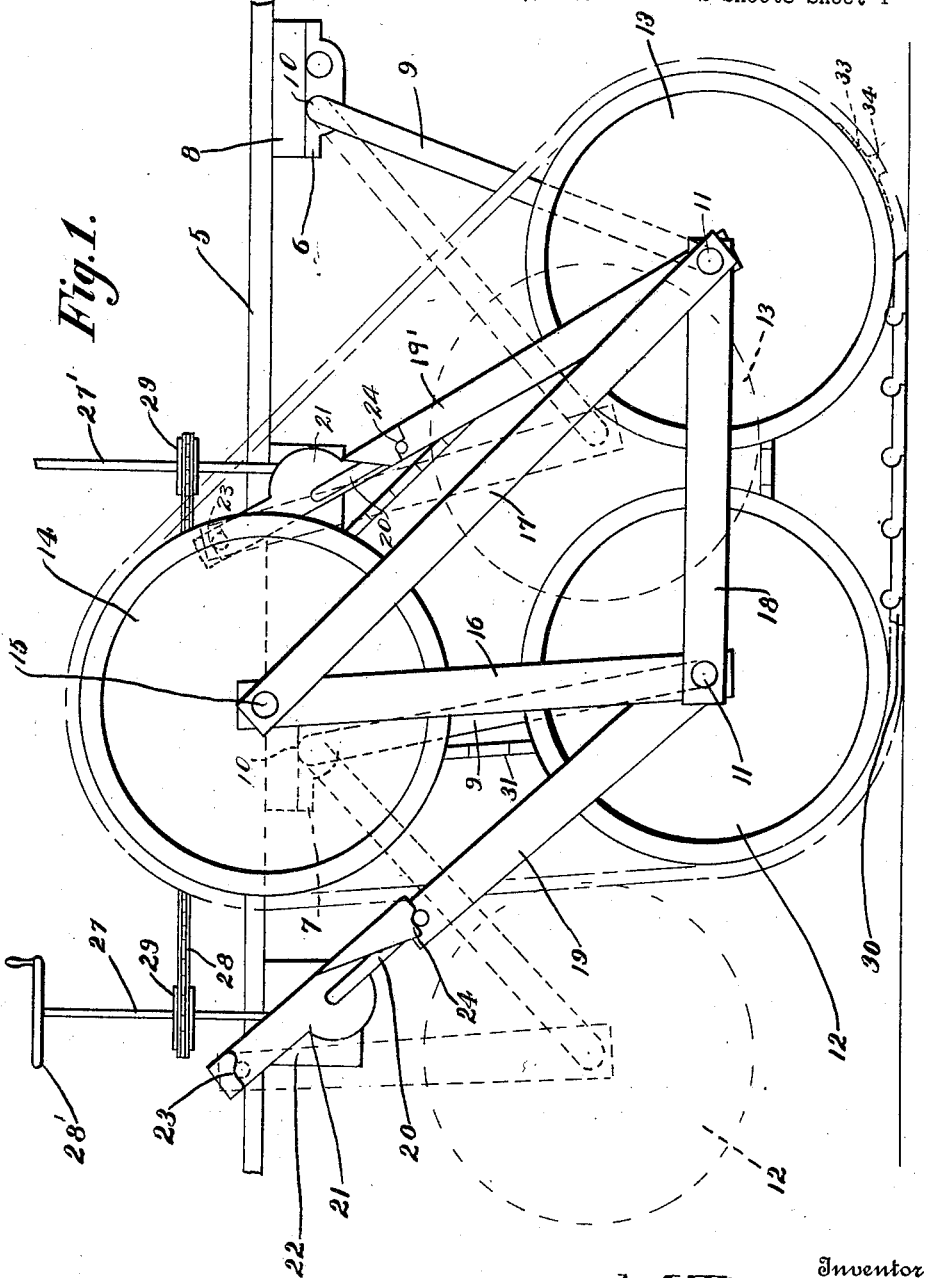

Patented Jan. 27, 1925.

1,524,064

UNITED STATES PATENT OFFICE.

MATHEW TIERNAN, OF LANTRY, SOUTH DAKOTA.

TRACTOR.

Application filed May 11, 1920. Serial No. 380,507.

*To all whom it may concern:*

Be it known that I, MATHEW TIERNAN, a citizen of the United States, residing at Lantry, in the county of Dewey and State of South Dakota, have invented a new and useful Tractor, of which the following is a specification.

This invention has reference to tractors, and it is the primary object of the invention to provide novel means for adjusting the frame or body thereof to maintain the body level, thus adapting the tractor for use on sides of hills.

A further object of the invention is the provision of novel means for accomplishing the adjustment of the tractor, at the will of the operator, and accomplish such adjustment while the tractor is moving.

A still further object of the invention is to provide a device of this character which may be employed to convert the usual four wheel tractor into the creeper type of tractor.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of one portion of a tractor frame.

Figure 2 illustrates a rear elevational view of the tractor frame.

Figure 3 illustrates a fragmental sectional view of the operating means.

Figure 4 illustrates a plan view of an attachment employed in connection with the wheels.

Figure 5 illustrates a side elevational view of the same.

Referring to the drawings in detail, the reference character 5 designates the rear portion of a tractor frame, which is of the usual construction and is provided with bearing members 6 and 7 supported under the frame 5, the beams 8 being positioned under the frame 5 directly over members 6 and 7 to provide means for securing the bearing members 6 and 7 to the frame.

Each of these bearing members is relatively long, being of a length to extend substantially the entire width of the frame 5, for purposes to be hereinafter more fully described.

Supporting shafts indicated at 9 have their upper right angled ends supported in the bearings, as at 10, the lower right angled ends 11 thereof providing axles for the power wheels 12 and 13 which are mounted to operate thereon, the supporting shafts 9 also including angularly disposed arms 10', which brace the supporting shafts and maintain the same rigid at all times.

These frames are of course movable, the frames on one side of the main frame being designed to move in one direction, while the frames on the opposite side move in the opposite direction.

Associated with the wheels 12 and 13, are power pulleys 14, which are mounted on the usual drive shaft of a tractor, the pulleys 14 being keyed or otherwise secured to the shaft 15. Sprockets 13' are also mounted to rotate with shaft 15, the sprockets transmitting movement to the sprockets 32 mounted on the shafts 11, the sprockets 32 being secured to the hubs 32' of the wheels 12 and 13 which contact with the ground surface, to cause the tractor to be moved over the ground surface.

A removable triangular frame including the bars 16, 17 and lower bars 18, also has connection with the shaft 15 and axles 11, to support the power wheels 12 and 13 in proper spaced relation with each other, when the machine is being moved from one location to another, thus insuring against the operation of the supporting shafts accidentally, but when the machine is in use, these frames are removed.

Having connection with each of the right angled ends or axles 11, are connecting arms 19 and 19' apertured at their lower extremities so that the same may be positioned over the right angled end 11 of the shaft 9 associated therewith, the upper ends of the arms being apertured to receive the lower right angled extremity of the arm 20 associated therewith. The arms 20 extend through openings in the stops or stirrups 21, where the same are positioned in the supporting blocks 22, which have connection with the undersurface of the frame 5.

This stop or stirrup 21 includes an upper notched portion 23 and a lower notched portion 24, and as shown the lower right angled portion of the arm 20 is disposed in the lower notched portion in a manner to prevent movement of the wheels 12 and 13, longitudinally of the frame 5, to prevent accidental adjustment of arms 19.

Supported on the upper right angled end of each of the crank arms 20, is a suitable gear indicated at 25, which meshes with the worm 26 provided on the lower extremity of the controlling rod 27 that is supported by the frame 5, and provided on its upper extremity with an operating wheel 28′, by means of which the rod 27 may be operated to cause the rotary movement to be imparted to the crank arms 20 to cause the same to swing to a position as indicated in dotted lines in Figure 1 of the drawings, wherein the lower right angled portions of the crank arms 20 are shown as disposed in the upper recessed portions of the stop or stirrup 21.

It is of course obvious that the operating rod 27′ which is associated with the controlling rod 27, has connection with the rod 27 through the medium of the chain 28, which operates over the sprocket wheels 29 secured to the respective rods 27 and 27′. It should be understood however that there are rods 27 and 27′ on both sides of the frame.

While I have shown and described the operating means which operates to adjust one side of the frame of the tractor, it is to be understood that this structure is duplicated on the opposite side of the tractor, so that an operator may be adjusting the supporting wheels 11 and 13, of one side of the tractor, at predetermined intervals, cause the tractor frame to be maintained level, as for instance, when the tractor is employed on on the sides of the hills. By reference to Figure 2 of the drawings, which discloses a rear elevational view, the foregoing operation will be obvious.

In the use of the device as employed with the creeper type of propelling means, the detachable plates indicated by the reference character 33, are applied to the surfaces of the respective wheels 12, 13 and 14, which plates carry tongues 34 to engage within the links of the creeper, thus converting these drive wheels into sprocket wheels for supporting the creepers in a manner so that the creepers will impart rotary movement to the wheels.

The creeper attachment is to be used only when the device is employed for work on relatively soft surfaces, but if it is desired to employ the tractor for the ordinary work, the creeper structure may be eliminated, the wheels 12 and 13 acting as the bull wheels, of the tractor.

It might be further stated, that the wheels 12 and 13, when used, without the creeper 30, receive their power through the chain 31, which operates over sprocket wheels 32 supported adjacent to the respective wheels 12, 13 and 14.

From an inspection of Figure 1 of the drawings, and more particularly the dotted lines of the wheels 12 and 13, it will be seen that when the arms 19 are moved to a position as indicated in dotted lines, the frame 5 of the tractor is moved into closer relation with the surface over which he device is operating, to accomplish the adjustment.

Having thus described the invention, what is claimed as new is:—

In a tractor, a main frame, a pair of triangular pivoted frames supported transversely of the main frame and at each side thereof, an axle forming a part of each frame, a wheel mounted on each axle, means for moving the frames at one side of the main frame independently of the triangular frames at the opposite side of the main frame, removable frames for connecting the axles to the main frame, to restrict movement of the triangular frames In testimony that I claim the foregoing as my own, I have hereto affixed my signature in the presence of two witnesses.

MATHEW TIERNAN.

Witnesses:
J. R. PATTERSON,
F. T. BENGEL.